US007950770B2

(12) United States Patent
Tokuno et al.

(10) Patent No.: US 7,950,770 B2
(45) Date of Patent: May 31, 2011

(54) METHOD AND DROPLET-EJECTING HEAD FOR DROPLET-EJECTING RECORDING APPARATUS CAPABLE OF ACHIEVING HIGH RECORDING IMAGE QUALITY

(75) Inventors: Toshiroh Tokuno, Machida (JP); Michio Umezawa, Kawasaki (JP); Kaichi Ueno, Ikeda (JP); Kouji Ohnishi, Akashi (JP)

(73) Assignee: Ricoh Company, Ltd., Tokyo (JP)

( * ) Notice: Subject to any disclaimer, the term of this patent is extended or adjusted under 35 U.S.C. 154(b) by 977 days.

(21) Appl. No.: 11/710,196

(22) Filed: Feb. 22, 2007

(65) Prior Publication Data

US 2007/0222812 A1 Sep. 27, 2007

(30) Foreign Application Priority Data

Feb. 28, 2006 (JP) ................................ 2006-054123
Oct. 27, 2006 (JP) ................................ 2006-292965

(51) Int. Cl.
*B41J 2/165* (2006.01)
*B01D 17/035* (2006.01)

(52) U.S. Cl. .......................................... 347/22; 210/718

(58) Field of Classification Search .................... 347/22, 347/23; 210/718
See application file for complete search history.

(56) References Cited

U.S. PATENT DOCUMENTS 4,388,627 A 6/1983 Umezawa
4,429,317 A 1/1984 Umezawa et al.
4,449,135 A 5/1984 Umezawa
4,451,169 A 5/1984 Umezawa
4,524,365 A 6/1985 Kakeno et al.
4,626,874 A 12/1986 Murai et al.
4,660,825 A 4/1987 Umezawa
4,739,347 A 4/1988 Ishikawa et al.
4,834,533 A 5/1989 Horike et al.
5,347,713 A 9/1994 Shibata et al.
5,754,202 A 5/1998 Sekiya et al.
5,818,482 A 10/1998 Ohta et al.
6,168,256 B1 * 1/2001 Sharma et al. .................. 347/28
6,527,903 B1 3/2003 Kataoka et al.
6,568,794 B2 5/2003 Yamanaka et al.
6,695,443 B2 2/2004 Arita et al.

FOREIGN PATENT DOCUMENTS

EP 0538843 A2 4/1993
EP 0771659 A2 5/1997
JP 10-305582 11/1998
JP 2914146 4/1999
JP 2001-58142 3/2001
JP 3196796 6/2001
JP 2004-181893 7/2004

(Continued)

OTHER PUBLICATIONS

May 7, 2009 European official action in connection with a counterpart European patent application No. 07 250 760.

(Continued)

*Primary Examiner* — An H Do
(74) *Attorney, Agent, or Firm* — Cooper & Dunham LLP

(57) ABSTRACT

This patent specification describes a droplet-ejecting head including a nozzle substrate having a plurality of nozzles for ejecting droplets, and an actuator configured to be driven to generate energy for ejecting droplets through each nozzle. The nozzle substrate is cleaned by a cleaning liquid containing microbubbles before being bonded to another member.

20 Claims, 12 Drawing Sheets

FOREIGN PATENT DOCUMENTS

| | | | |
|---|---|---|---|
| JP | 2005-882 | | 1/2005 |
| JP | 3763521 | | 1/2006 |
| JP | 3785406 | | 3/2006 |
| WO | WO01/36105 | A1 | 5/2001 |

OTHER PUBLICATIONS

Jun. 3, 2008 European search report in connection with corresponding European patent application No. 07 250 760.

* cited by examiner

METHOD AND DROPLET-EJECTING HEAD FOR DROPLET-EJECTING RECORDING APPARATUS CAPABLE OF ACHIEVING HIGH RECORDING IMAGE QUALITY

TECHNICAL FIELD

The present disclosure relates to a method and a droplet-ejecting head, and more particularly to a method and a droplet-ejecting head for a droplet-ejecting recording apparatus capable of achieving high-quality recording image.

BACKGROUND

Nonimpact recording apparatuses have been getting attention in business and other environments because their operation noise is small. Among them, inkjet recording apparatuses have recently come in widespread use, because they can record at a high speed on plain paper without the need for special fixing processing. In particular, on-demand-type inkjet recording apparatuses, among others, have been becoming increasingly widely used in recent years, because of low operation noise, high-resolution image output, and other characteristics.

Since recording heads used in these inkjet recording apparatuses eject ink droplets through nozzles, the shape, precision, and other properties of the nozzles have a significant effect on the ink droplet ejecting characteristics. The ink droplet ejecting characteristics are also affected by the surface properties of the nozzle forming member in which the nozzle holes are formed. It is known that, for example, uneven buildup of ink on the surface of the nozzle forming member around the nozzle holes would bend the trajectory of flying droplets, produce droplets of different sizes, cause fluctuations in the droplet flying speed, or cause other problems.

Several attempts have been made to solve these problems. For example, a method of forming a nozzle hole that prevents variations in the ink droplet flying direction is disclosed. The disclosed method includes the steps of attaching an adhesive member to one face of a nozzle forming member, applying a laser beam to the nozzle forming member from the other face in such a way that a part of the nozzle forming member remains after machining, and peeling off the adhesive member. Since the remaining part of the nozzle forming member is removed with the adhesive member, unmachined parts do not remain on the exit side of the nozzle hole.

As another attempt, a method of forming a nozzle by coating one face of a nozzle forming member with a fluorine-based polymer layer, forming nozzle holes by applying an excimer laser to the nozzle forming member from the other face, and removing the coating layer on the nozzle holes is disclosed. Further, as another attempt, a technique for stabilizing the flying of ink droplets is disclosed. This head is produced by forming on one face of the nozzle forming member a water-repellent film made of an organic resin layer containing a tetrafluoroethylene-based copolymer to provide a uniform surface on the nozzle forming member.

If a resin material is used as the nozzle forming member, it is difficult to form a water-repellent film on the surface of the resin material as described above, because the water-repellent agent has poor adhesion to the resin material. Several attempts to enhance adhesion of the water-repellent agent have been made, for example, by roughening the surface of the resin material to form microscopic asperities, but sufficient adhesion has not yet been achieved. The applied water-repellent agent initially provides good water-repellency, but its function gradually degrades because the water-repellent layer, if not adhered well, gradually peels off due to performance of repetitive wiping operations for removing ink droplets and foreign particles adhered to the nozzle plate and openings.

If a fluorine-based water-repellent agent is used, a silicon dioxide (SiO2) film is formed on the surface of the nozzle forming member formed of resin or another material in order to enhance the adhesion of the fluorine-based water-repellent. In this case, the SiO2 film should be sufficiently thick, 200 Å or more for example, to achieve sufficient adhesion. If excimer laser machining or the like is used to form nozzle holes, a suitable resin material such as polyimide should be selected for the nozzle forming member. The SiO2 film cannot be machined well and abnormal nozzle holes will be formed.

In the known nozzle manufacturing methods, the nozzle forming member and the liquid chamber forming member are cut into chips (i.e., individual heads) before being bonded to each other. After being cut into chips, the nozzle forming member and the liquid chamber forming member should be handled in chip units at the following stages. This requires a lengthy handling time at the bonding, excimer laser machining, and cleaning stages, resulting in low productivity in a mass production environment.

To address these problems, a recording head manufacturing method is disclosed. This head includes a nozzle substrate with a plurality of nozzles and a plurality of ink liquid chambers in communication with the nozzles. Actuators associated with the nozzles are driven to generate energy to eject ink droplets through the nozzles. In this recording head manufacturing method, the nozzle substrate is formed of a nozzle forming member and a liquid chamber forming member. The nozzle forming member has a water-repellent film on the ink-ejecting surface. The liquid chamber forming member partially forms the surface of the ink chambers and is bonded to the nozzle forming member, on the surface opposite the ink-ejecting surface.

When the liquid chamber forming member is bonded to the nozzle forming member, a liquid chamber forming member wafer that is integrally arranged of a plurality of liquid chamber forming members is bonded to the nozzle forming member to form a nozzle substrate cluster. Then, nozzles are formed in the nozzle forming member and the nozzle substrate cluster is cut into chips of a predetermined size, and individual chips are bonded to the actuators.

This cutting operation is performed by dicing as in known IC manufacturing. More specifically, a wafer that has been machined by an excimer laser is placed on the dicing machine with the UV-curable adhesive tape facing the machining table and diced along the chip contour of the liquid chamber forming member to produce individual nozzle substrates. This dicing operation is performed until the nozzle substrate cluster is completely cut and the UV-curable adhesive tape is cut halfway therethrough, i.e., into approximately half the thickness of the tape. This UV-curable adhesive tape can easily be expanded at the next stage. The dicing machine has also a cleaning station to remove sawdust immediately after dicing.

The cleaning operation performed in the above cleaning station, however, cannot completely remove the sawdust produced by dicing, because one face of the liquid chamber forming member having an intricate structure is blocked by the nozzle substrate and sawdust penetrates deep into the liquid chamber grooves. Accordingly, some dust may remain in nozzle holes and liquid chambers. As with the uneven buildup of ink, such remaining sawdust would bend the flying trajectory of ink droplets, produce ink droplets of different sizes, make the flying speed of the ink droplets unstable, or cause other problems.

As described above, the known droplet-ejecting heads formed by successively bonding a nozzle forming member with many nozzle holes, a liquid chamber forming member with liquid chambers corresponding to the nozzle holes, and an actuator substrate are manufactured by cutting a large wafer-like base material into chips and adhesive-bonding the chip-sized nozzle forming members and liquid chamber forming members thus obtained. Since the chips are cleaned before being bonded, it is relatively easy to remove dicing sawdust and foreign particles.

This known manufacturing method has a disadvantage, however, that positioning, bonding, and other operations are complicated because it is required to bond together small chips. Recently, to solve such problems, a new technique is being adopted, in which a sheet-like nozzle forming member cluster integrating a plurality of nozzle forming members is directly bonded to a sheet-like liquid chamber forming member cluster integrating a plurality of liquid chamber forming members, nozzle holes are then formed in the nozzle forming member cluster, and the bonded clusters are cut and separated into chips.

If this manufacturing method is adopted, another problem arises that it is difficult to remove the sawdust and other foreign particles that are produced in the cutting operation because they enter the nozzle holes and liquid chambers. As described above, it is difficult to completely remove sawdust and other foreign particles by cleaning using running water because the known inkjet recording heads (droplet-ejecting heads) have complicated grooves formed inside the clusters and have nozzle plates that are formed in the deep recess and have fine nozzle holes. If any sawdust or foreign particles remain, the ink ejection characteristics of the nozzles would be affected and defective heads would be produced.

SUMMARY

This patent specification describes a novel a droplet-ejecting head including a nozzle substrate having a plurality of nozzles for ejecting droplets, and an actuator configured to be driven to generate energy for ejecting droplets through each nozzle. The nozzle substrate is cleaned by a cleaning liquid containing microbubbles before being bonded to another member.

This patent specification further describes a novel method of manufacturing a droplet-ejecting recording apparatus, which includes a plurality of droplet ejecting nozzles, a plurality of liquid chambers in communication with the nozzles, and a plurality of actuators configured to be driven to generate energy for ejecting droplets through the nozzles, includes a step of cleaning at least one member through which a liquid passes before being transformed into droplets using a cleaning liquid containing microbubbles.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
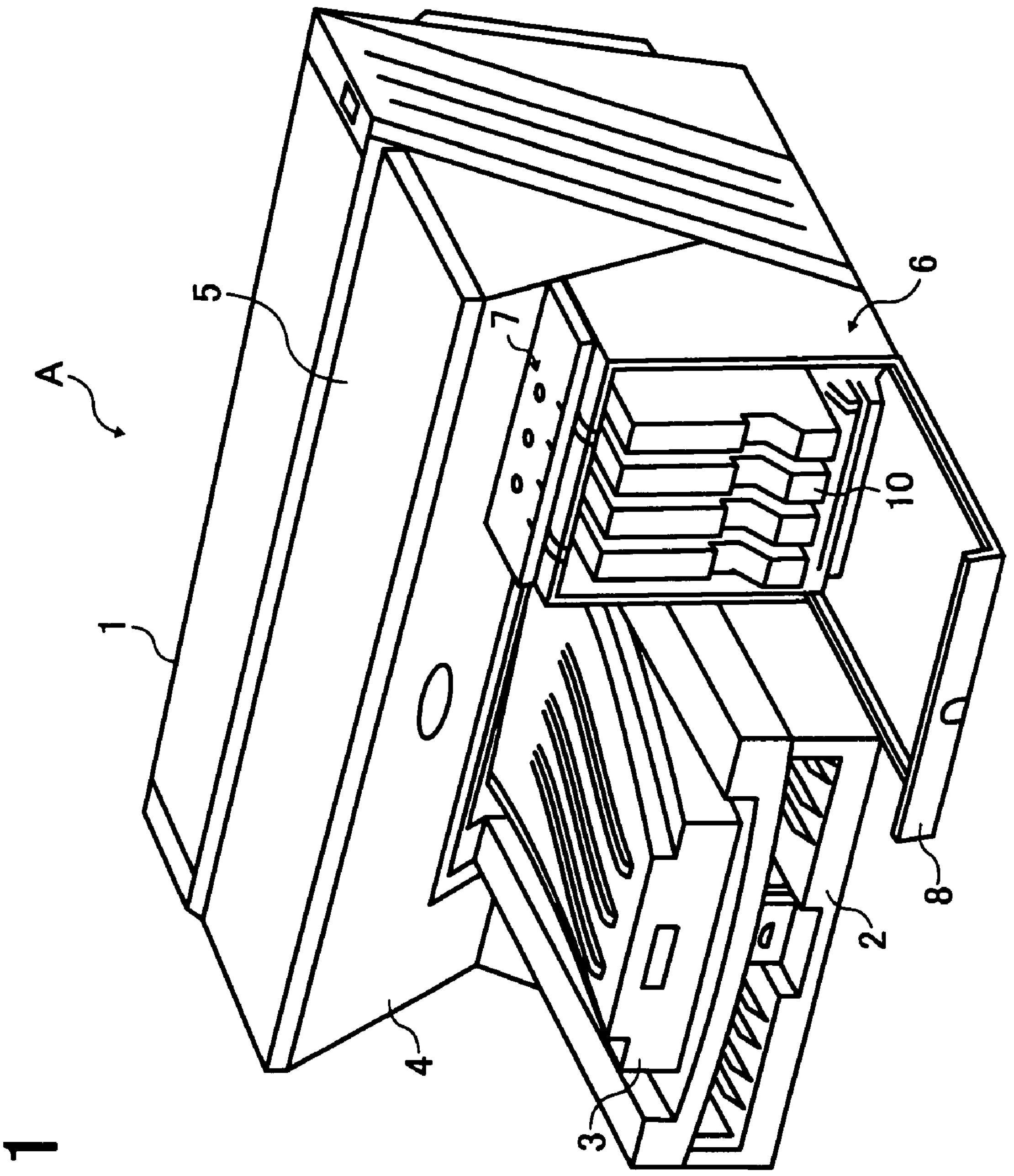
FIG. 1 illustrates a schematic perspective view of the front side of an inkjet recording apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 4, a recording head according to exemplary embodiments are described.

FIG. 1 illustrates an inkjet recording apparatus as an example of a droplet-ejecting recording apparatus (image forming apparatus). An inkjet recording apparatus A represents an embodiment of an image forming apparatus according to the present disclosure. The inkjet recording apparatus A includes a main body 1, a paper feed tray 2 attached to the main body 1 for feeding paper sheets as recording media, and a delivery tray 3 attached to the main body 1 for holding output paper sheets on which images have been recorded (formed). The inkjet recording apparatus A further includes a cartridge loading unit 6 having an operation panel 7 with operation keys and indicators on its top surface. The cartridge loading unit 6 protrudes from one side of the front face 4 of the main body 1 and is set back from the top face 5. The cartridge loading unit 6 is equipped with a front cover 8 that can be opened to mount or demount ink cartridges 10 that serve as liquid storage tanks (main tanks).

Figure 2:
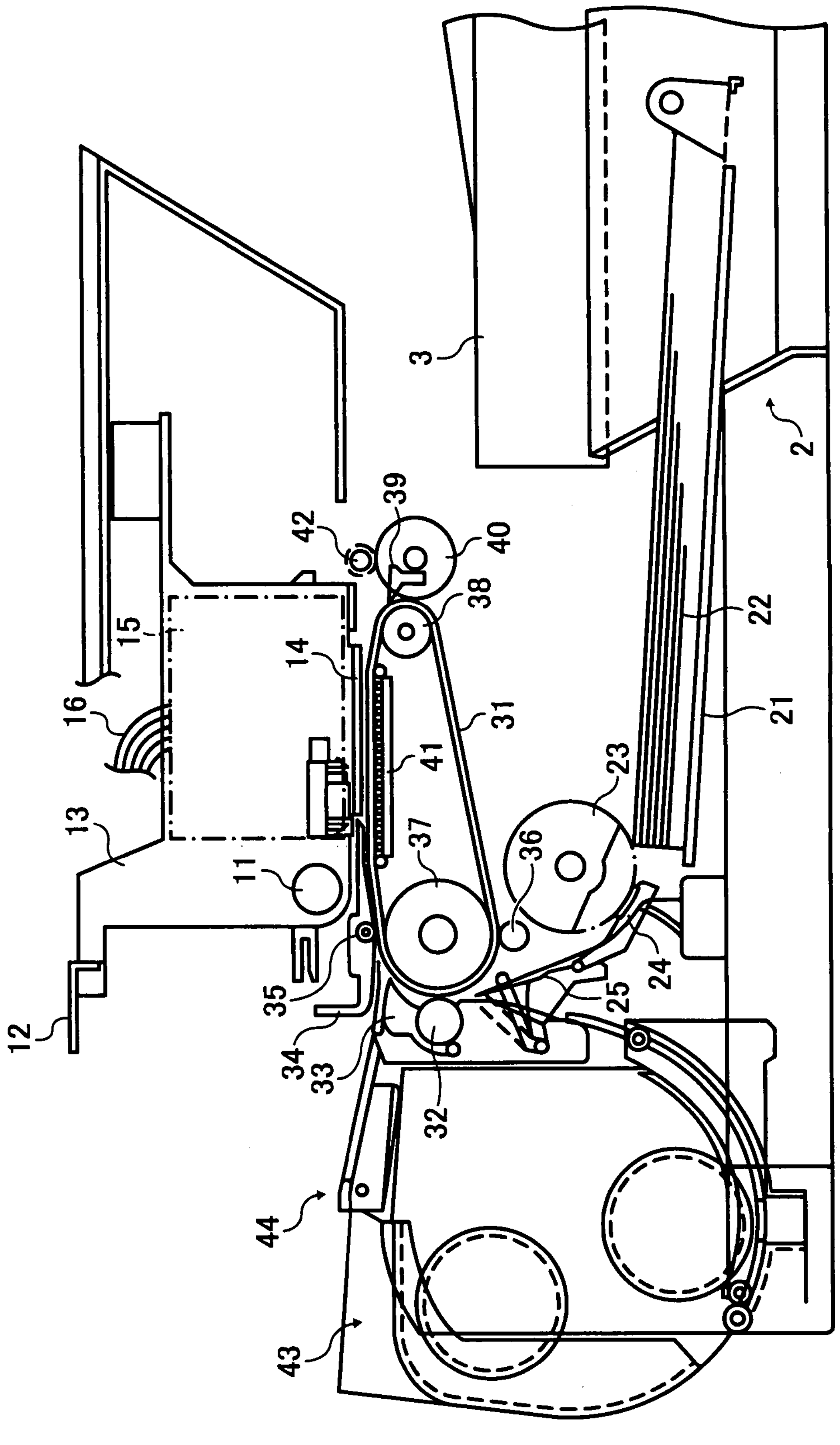
FIG. 2 illustrates a schematic view showing the whole configuration of mechanical sections of the inkjet recording apparatus shown in FIG. 1.
Figure 3:
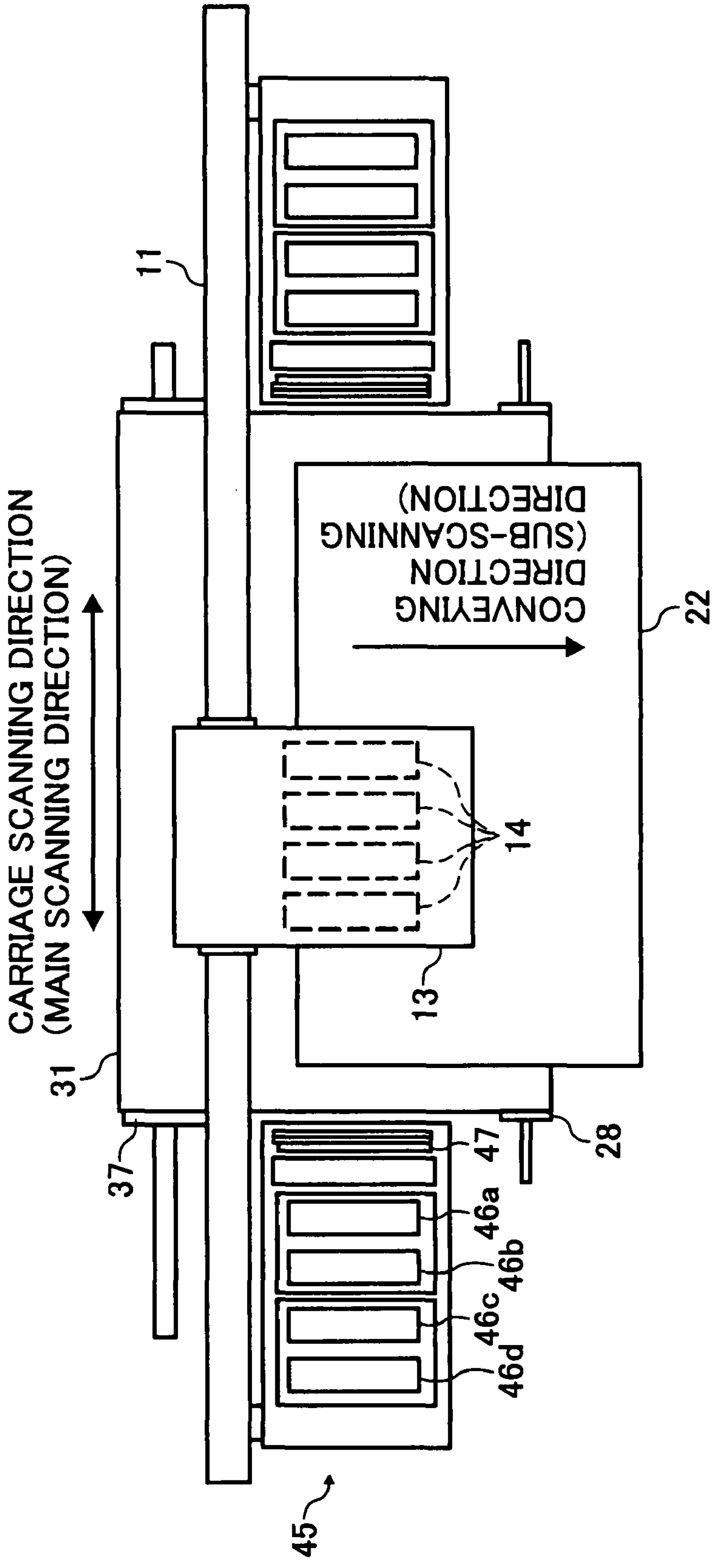
FIG. 3 illustrates a plan view representing essential parts of the mechanical sections shown in FIG. 2.

FIG. 2 schematically illustrates the mechanical sections of the inkjet recording apparatus A shown in FIG. 1. FIG. 3 illustrates essential parts of the mechanical sections shown in FIG. 2. The mechanical sections of the inkjet recording apparatus A will now be described with reference to FIGS. 1 to 3. A carriage 13 is slidably held by a guide rod 11, that is bridged between right and left side plates (not shown), and a stay 12 so as to be slidable in the main scanning direction indicated by the arrow in FIG. 3 and is moved by a main scanning motor (not shown) in this direction. The carriage 13 is equipped with four recording heads (droplet-ejecting heads) 14 for ejecting yellow (Y), cyan (C), magenta (M), and black (Bk) ink droplets. Each recording head 14 has a plurality of ink ejection ports arrayed in a direction intersecting the main scanning direction, with the ink ejection ports facing downward.

The recording head 14 is an inkjet recording head incorporating piezoelectric actuators including piezoelectric elements for generating ink ejecting energy. Other energy generating means may be used to generate ink ejecting energy, such as a thermal actuator based on a heat resistor or another electrothermal converter that makes use of the phase change of the film of boiling liquid, a shape memory alloy actuator that makes use of the metal phase change caused by temperature change, and an electrostatic actuator that makes use of electrostatic force. Namely, in the present disclosure, the actuator for generating ink ejecting energy may be of any structure and type.

As described above, the recording head 14 of this embodiment incorporates piezoelectric actuators (piezoelectric elements) as the energy generating means. The recording heads 14 may be configured as a single inkjet recording head having a plurality of nozzle arrays ejecting droplets of different colors. The carriage 13 carries subtanks 15 containing different color inks to be supplied to the corresponding recording heads 14. The subtanks 15 are replenished with different color inks supplied through the ink feeding tubes 16 from the main tanks (ink cartridges) 10. The main tanks 10 contain yellow (Y), cyan (C), magenta (M), and black (Bk) inks. The main tank 10 for black ink has a capacity larger than those for color inks.

The sheets 22 stacked on the sheet stacker (platen) 21 of the paper feed tray 3 are fed into the inkjet recording apparatus A by a sheet feeding unit. The sheet feeding unit includes a semicircular roller (sheet feeding roller) 23 and a separation pad 24 facing the sheet feeding roller 23. The sheet feeding roller 23 feeds the sheets 22 one by one from the sheet stacker 21. The separation pad 24 is made of a material having a high coefficient of friction and urged toward the sheet feeding roller 23 by an elastic member.

The sheet 22 fed from the sheet feeding unit is conveyed by a conveying unit and passes under the recording heads 14. The conveying unit includes a conveyor belt 31 that conveys the sheet 22 attracted by static electricity, a counter roller 32, a conveying guide 33, a retaining member 34, and a leading-end pressurizing roller 35 urged toward the conveyor belt 31 by a retaining member 34. The counter roller 32 cooperates with the conveyor belt 31 to hold the sheet 22 fed through the guide 25 from the sheet feeding unit. The conveying guide 33 changes the direction of the sheet 31 through approximately 90° to make it follow the upper surface of the conveyor belt 33. A charging roller 36 electrostatically charges the surface of the conveyor belt 31.

The conveyor belt 31 is an endless belt entrained around a conveying roller 37 and a tension roller 38 and runs in the conveying direction shown in FIG. 3. The charging roller 36 is brought into contact with the surface of the conveyor belt 31 and rotated as the conveyor belt 31 runs. The charging roller is urged toward the conveyor belt by a pressure of 2.5N applied to both ends of its shaft. A guide member 41 is disposed on the rear side of the conveyor belt 31 at an area corresponding to the printing region of the recording head 14. The top surface of the guide member 41 protrudes toward the recording head 14 from the tangential line between the two rollers (conveying roller 37 and tension roller 38) that support the conveyor belt 31. Since the conveyor belt 31 is lifted by the top face of the guide member 41 in the printing region, it is kept precisely flat in this area.

The guide member 41 has a plurality of grooves on its surface facing the rear face of the conveyor belt 31. The grooves run in the main scanning direction, i.e., in the direction orthogonal to the conveying direction, to facilitate the movement of the conveyor belt 31 by reducing the area of the guide member 41 that touches the conveyor belt 31.

The sheet 22 printed upon by the recording heads 14 is delivered by a sheet delivery unit. The sheet delivery unit includes a separation pawl 39 for separating the sheet 22 from the conveyor belt 31, a sheet delivery roller 40, a sheet pinch roller 42, and a sheet delivery tray 3 disposed below the sheet delivery roller 40. The sheet delivery roller 40 and the sheet pinch roller 42 are located sufficiently far above the sheet delivery tray 3 to allow a large number of sheets to be held in the sheet delivery tray 3.

A double-sided sheet feeding unit 43 is detachably attached to the rear side of the main body 1. The double-sided sheet feeding unit 43 receives the sheet 22 returned by the conveyor belt 31 running in the reverse direction, flips it over, and feeds it again into between the counter roller 32 and the conveyor belt 31. A manual sheet feeding unit 44 is also provided above the double-sided sheet feeding unit 43.

To maintain and recover the nozzle condition of the recording heads 14, maintenance and recovery mechanisms (referred to hereinafter as subsystems) 45, 45 are provided in non-printing regions on both sides of the scanning area of the carriage 13, as shown in FIG. 3. The subsystems 45, 45 each have cap members 46*a*, 46*b*, 46*c*, 46*d* for capping the nozzle faces of the recording heads 14 and a wiper blade 47 for wiping the nozzle faces.

In the inkjet recording apparatus A of this embodiment, each sheet 22 is separately fed from the paper feed tray 2, directed upward by the guide 25, caught and conveyed between the conveyor belt 31 and the counter roller 32, then guided by the conveying guide 33 that guides the leading end of the sheet 22, pressed against the conveyor belt 31 by the leading-end pressurizing roller 35, and turned through approximately 90° to be further conveyed. During this conveying operation, a control circuit (not shown) causes positive and negative voltages to be alternately applied from a high-voltage power supply to the charging roller 36 and accordingly the conveyor belt 31 is alternately charged with positive and negative voltages at predetermined intervals in the sub-scanning direction, i.e., conveying direction.

When the sheet 22 is fed onto the alternately charged conveyor belt 31, the sheet 22 is electrostatically attracted to the conveyor belt 31 and conveyed in the sub-scanning direction. Then, the sheet is stopped to record one line. The carriage 13 is moved, the recording heads 14 are driven according to an image signal, and ink droplets are ejected onto the sheet 22. Then, the sheet 22 is conveyed a predetermined distance and the next line is recorded. When a recording completion signal or a signal indicating that the trailing end of the sheet 22 has reached the recording region is received, the recording operation ends and the sheet 22 is ejected to the delivery tray 3.

In a standby state, the carriage 13 is drawn into the area of either subsystem 45, where the recording heads 14 are capped with the caps 46*a*-46*d* to keep the nozzles wet to prevent defective ink ejection due to dried ink. In this area, the recording heads 14 also perform a recovery operation by ejecting ink unrelated with actual printing before or between recording operations to keep the ejection performance stable.

Figure 4:
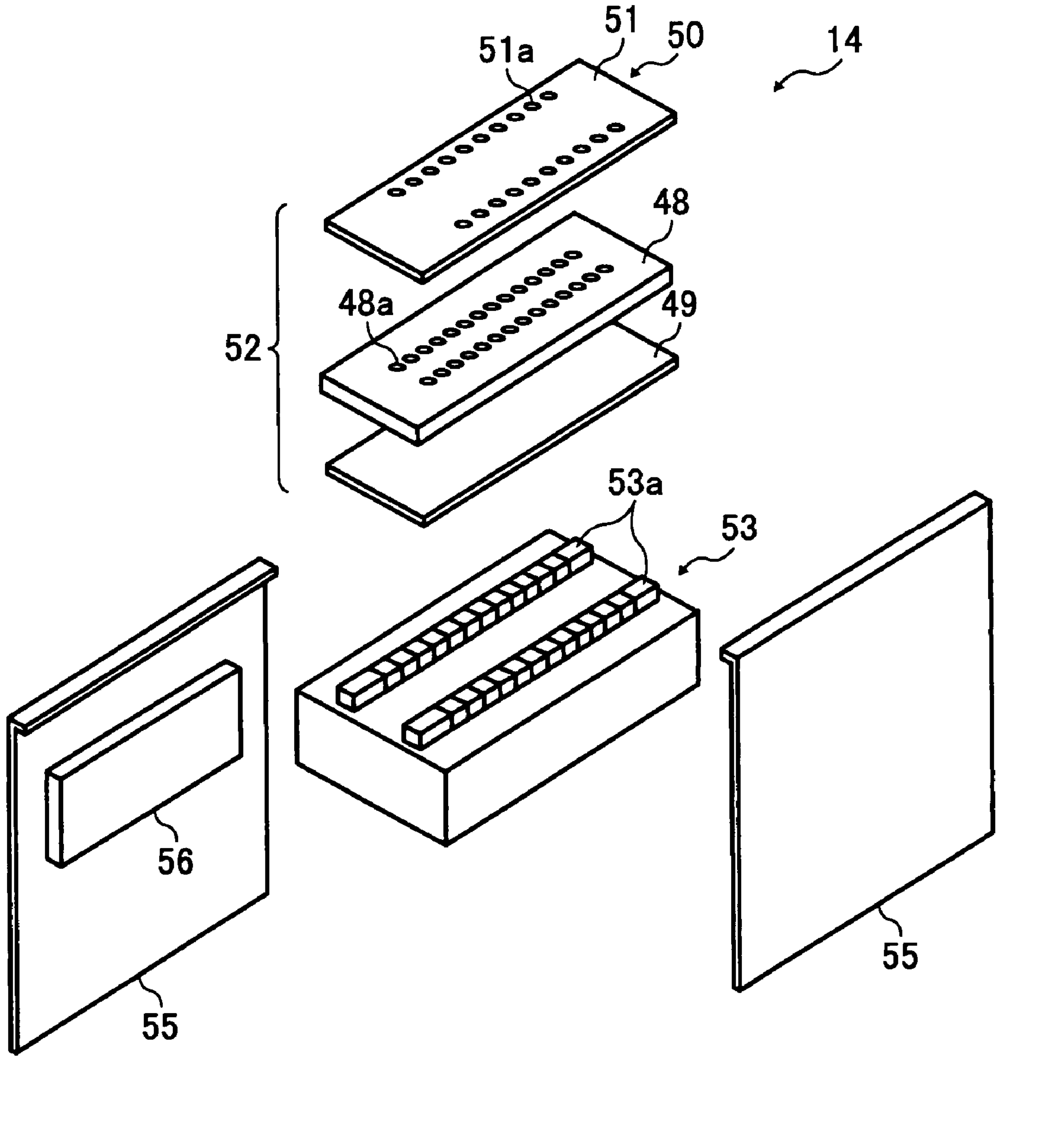
FIG. 4 illustrates an exploded perspective view of a recording head according to an embodiment of the present disclosure.

FIG. 4 illustrates an exploded perspective view of the recording head according to the present disclosure. As shown in FIG. 4, the recording head (droplet-ejecting head) 14 of the inkjet recording apparatus A in FIG. 1 includes a nozzle substrate 52, a piezoelectric actuator substrate 53, FPC cables 55, and a frame (not shown). The nozzle substrate 52 is formed by successively bonding together a chip-like nozzle forming member 50 with a plurality of nozzles (holes) 51*a* formed on a substrate 51, a chip-like liquid chamber forming member 48 (channel plate) with a plurality of liquid chambers 48*a* corresponding to the nozzles 51*a*, and a diaphragm 49. The piezoelectric actuator substrate 53 carries a plurality of actuators 53*a* and is bonded to the nozzle substrate 52. These are supported by the frame. The diaphragm 49 is optional. Accordingly, the nozzle substrate 52 may conceptually include a bonded stack of two chips, i.e., the nozzle forming member 50 and the liquid chamber forming member 48. If the nozzle forming member 50 having a plurality of nozzles (holes) 51*a* is made of a resin film, the material cost can be reduced and the nozzles can be machined using a method selected from a wide range of choices.

Figure 5:
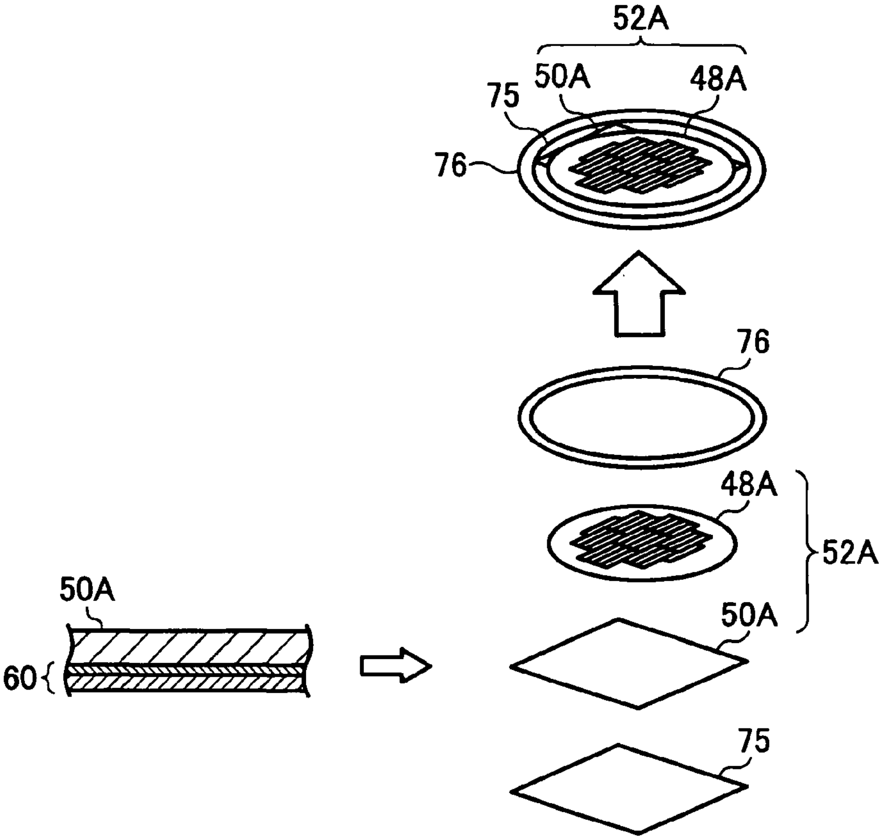
FIG. 5 illustrates a diagram showing a procedure for bonding a nozzle forming member cluster to a liquid chamber forming member cluster in the process of manufacturing the droplet-ejecting head of the present disclosure.

FIG. 5 illustrates a procedure for bonding a nozzle forming member cluster to a liquid chamber forming member cluster in the droplet-ejecting head manufacturing process according to the present disclosure. First, a water-repellent film 60 made of a silicon dioxide (SiO2) film and a fluorine-based water-repellent agent is formed on one face of the nozzle forming member 50. Since the SiO2 film and the fluorine-based water-repellent film are chemically bonded together, the fluorine-based water-repellent coating can be made very thin and thereby the required amount of water-repellent agent is reduced. This water-repellent film 60 has high durability against repeated wiping operations and provides high machinability. The liquid chamber forming member 48 is made of silicon (Si) for example. The liquid chamber forming member 48 is bonded to the opposite face of the nozzle forming member 50 where the water-repellent film 60 is not applied.

In the manufacturing method according to the present disclosure, the nozzle substrate cluster 52A is formed by bonding the nozzle forming member cluster 50A (nozzle forming member wafer) including a plurality of nozzle forming members 50 interconnected in the form of a sheet to the liquid chamber forming member cluster 48A (liquid chamber forming member wafer) including a plurality of liquid chamber forming members 48 interconnected in the form of a sheet, and then the nozzle substrate cluster 52A is cut into chips. If a Si wafer is used for the liquid chamber forming member cluster 48A, the liquid chamber forming members 48 can be packed at a high density, and a semiconductor processing system can be used at the following machining, cutting, and other stages.

Similar merits can be obtained with the nozzle forming member cluster 50A by packing the nozzle forming members 50 at a high density. If an epoxy-based adhesive is used to bond the nozzle forming member cluster 50A to the liquid chamber forming member cluster 48A, it is possible to selectively apply the adhesive to the bonding areas of each liquid chamber forming member 48, avoiding application to the nozzle holes 51*a* of each nozzle forming member 50. This facilitates nozzle machining and prevents nozzle diameter variations due to uneven adhesive application. After the nozzle forming member cluster 50A is adhesive-bonded to the liquid chamber forming member cluster 48A, an adhesive tape (UV (ultraviolet ray)-curable adhesive tape) 75 is attached to the other face of the nozzle forming member cluster 50A, over the water-repellent film 60. An annular ring jig 76 is then attached to the periphery of the bonded clusters. The adhesive tape 75 serves to hold together chips at a later stage.

Then, excimer laser machining is performed to form individual nozzle holes in each nozzle forming member of the nozzle forming member cluster 50A bonded to the liquid chamber forming member cluster 48A. Nozzle holes can be precisely formed without being affected by the precise alignment between the nozzle forming member cluster and the liquid chamber forming member cluster or misalignment caused by thermal expansion of the cured adhesive. A driver 56 for controlling signals is provided on the FPC cable 55.

Figure 6:
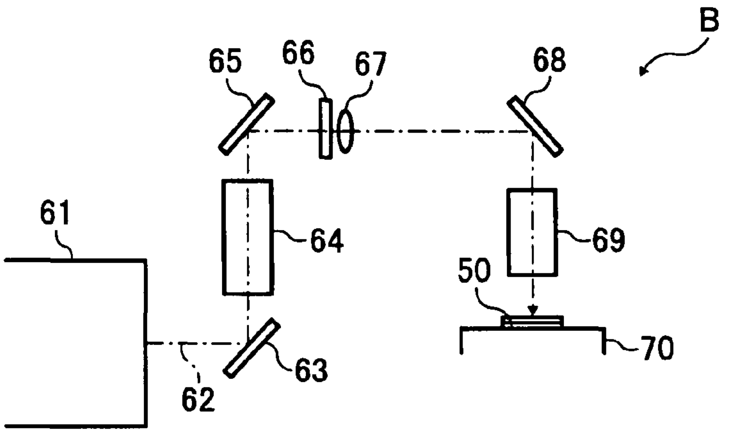
FIG. 6 illustrates a schematic view showing the structure of an excimer laser machining apparatus.

FIG. 6 illustrates the structure of an excimer laser machining system. The excimer laser machining system B is used to form the nozzles 51*a* in the nozzle substrates 52 of the recording heads 14. In the excimer laser machining system B, an excimer laser beam 62 is emitted from a laser oscillator 61, reflected by mirrors 63, 65, 68, and directed to a machining table 70, as shown in FIG. 6. In the optical path of the laser beam 62 from the oscillator 61 to the machining table 70, a beam expander 64 expands the laser beam 62 to a desired size, a mask 66 shapes the laser beam 62 according to the holes to be bored, and a field lens 67 directs the laser beam from the mask 66 to an image forming optical system 69. The machining table 70 is an XYZ table for example, on which the nozzle substrate 52 is placed and positioned for machining.

In the manufacturing method according to the present disclosure, the nozzle substrate cluster 52A is formed by bonding the liquid chamber forming member cluster 48A with a plurality of liquid chamber forming members 48 to the nozzle forming member cluster 50A with a plurality of nozzle forming members 50, and nozzles 51*a* are then formed in individual nozzle forming members 50 of the nozzle substrate cluster 52A by the excimer laser machining system B, before the nozzle substrate cluster 52A is cut into chips. The nozzle substrate cluster 52A is cut by dicing as in a typical IC manufacturing process. More specifically, the nozzle substrate cluster 52A backed with the UV-curable adhesive tape 75 is placed on the dicing machine with the adhesive tape 75 facing the machining table, and diced along the contour of each chip to obtain nozzle substrates 52.

In this dicing operation, cutting is desirably made halfway through the thickness of the UV-curable adhesive tape 75. Namely, the nozzle substrate cluster 52A is completely cut and separated into chips but held together by the halfway cut UV-curable adhesive tape 75. The halfway cut UV-curable adhesive tape 75 can easily be expanded at the next stage. The dicing machine is equipped with a cleaning station described below, for removing sawdust and other foreign particles after dicing by cleaning. After being cleaned, each nozzle substrate 52 is bonded to an electrostatic actuator 53.

Figure 7A:
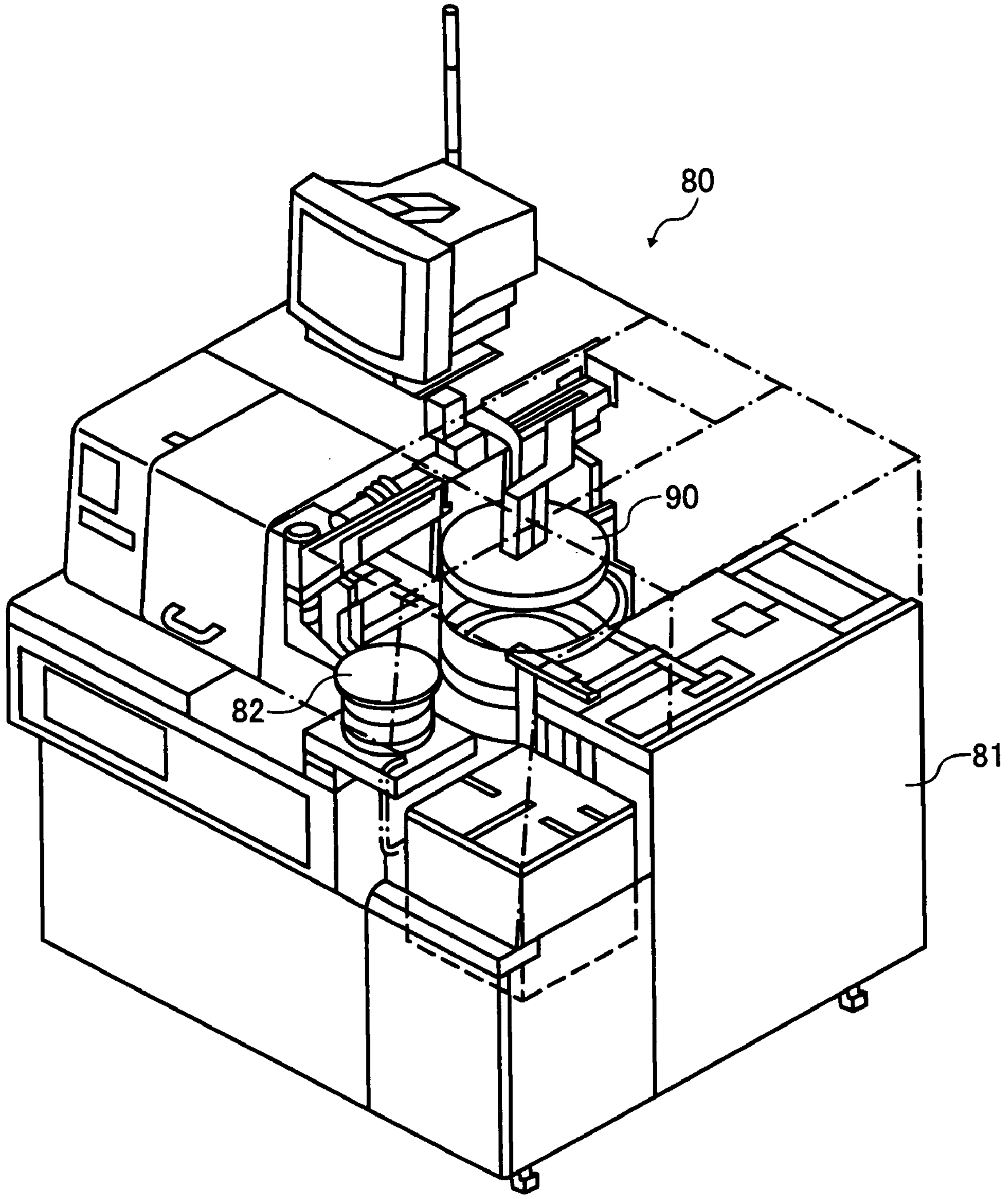
FIG. 7A illustrates a perspective view of a dicing and cleaning apparatus used at dicing and cleaning stages.
Figure 7B:
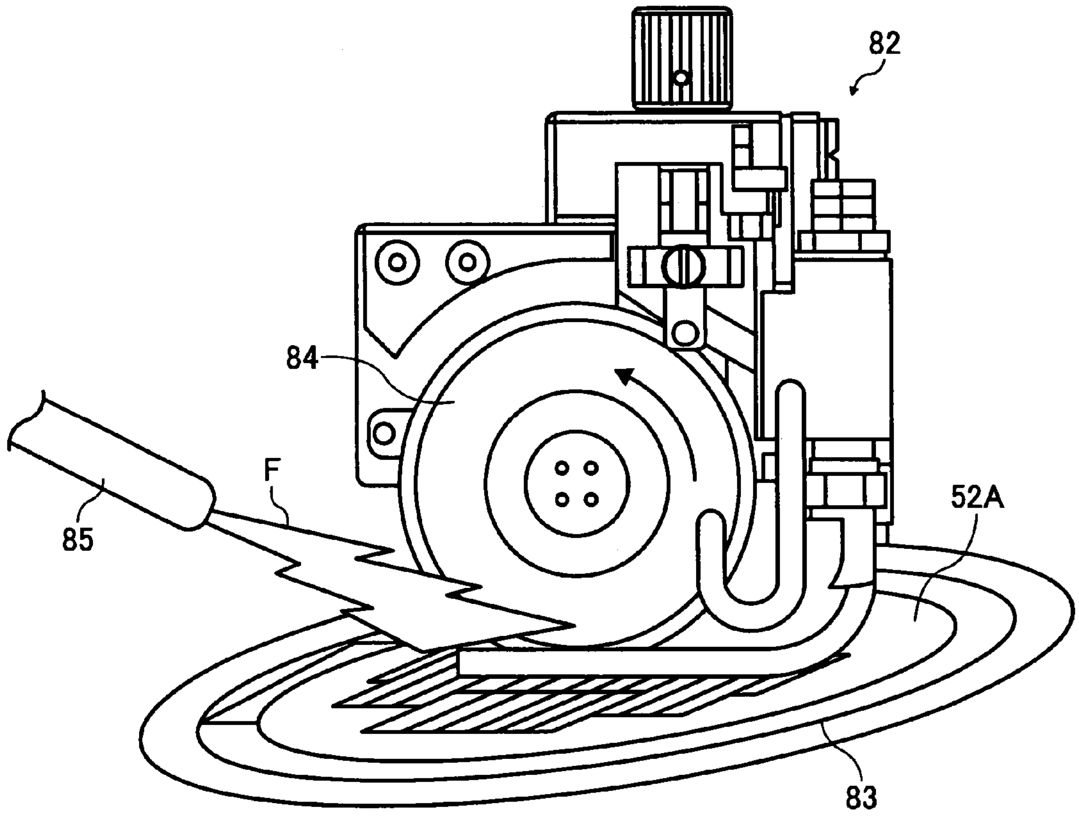
FIG. 7B illustrates a diagram representing the structure of a dicing unit.
Figure 7C:
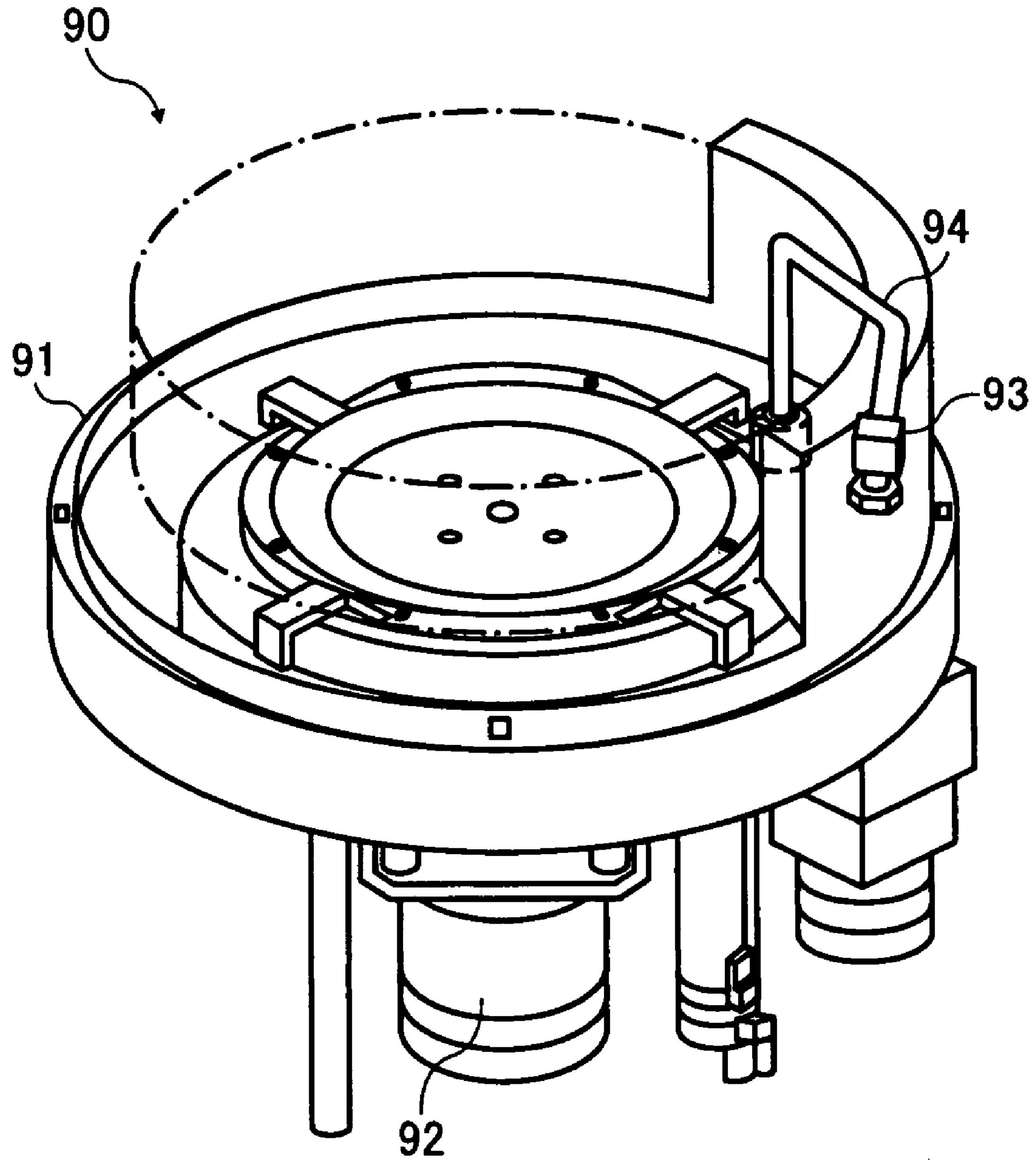
FIG. 7C illustrates a diagram representing the structure of a cleaning station.

FIG. 7A illustrates a dicing and cleaning apparatus used at the dicing and cleaning stage; FIG. 7B illustrates the structure of a dicing unit; and FIG. 7C illustrates the structure of a cleaning station. Since the dicing unit 82 and the cleaning station 90 are disposed close to each other on the main body 81 of the dicing and cleaning apparatus 80, the workpieces cut in the dicing unit 80 can be immediately cleaned in the cleaning station 90.

As shown in FIG. 7B, the dicing unit 82 has a table 83 movable in the X, Y, and Z directions for carrying the nozzle substrate cluster 52A backed with the adhesive tape 75, a dicing saw 84 that rotates to cut the nozzle substrate cluster 52A, a fluid delivery means 85 that delivers a cleaning liquid F for cooling and cleaning the site being cut by the dicing saw 84. During the cutting operation by the dicing saw 84, the fluid delivery means 85 continuously delivers the cleaning liquid F to the site being cut to facilitate cutting and wash off the sawdust. At this dicing stage, the nozzle substrate cluster 52A is completely cut into chips but the adhesive tape 75 is cut halfway therethrough.

As shown in FIG. 7C, the cleaning station 90 includes a rotating stage 91 actuated by a motor 92, and a cleaning nozzle 93. The nozzle substrate cluster 52A cut by the dicing unit 82 into chips and held together by the adhesive tape 75 is transferred to the rotating stage 91 for being cleaned.

Figure 8A:
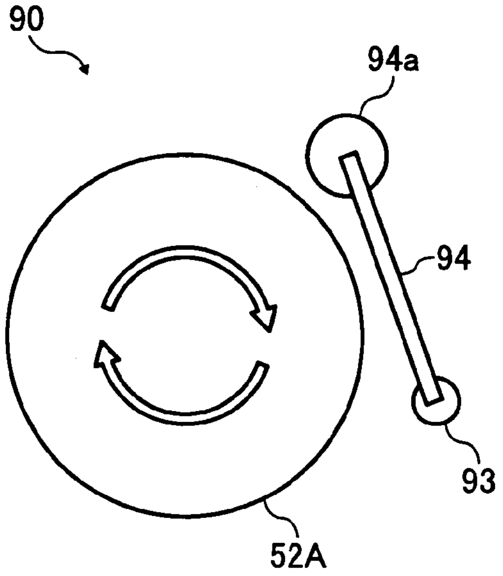
FIGS. 8A and 8B illustrate diagrams representing a cleaning procedure (cleaning nozzle operations) in the cleaning station.
Figure 8B:
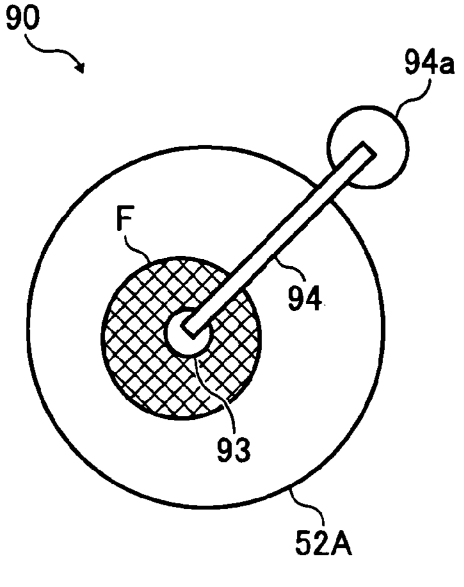

FIGS. 8A and 8B illustrate a cleaning procedure (cleaning nozzle operations) performed by the cleaning station 90. The cleaning nozzle 93 is located at one end of a delivery pipe 94 that is pivotable at the other end, i.e., base end 94*a*, so as to be rotatable in the horizontal direction. The delivery pipe 94 is configured to be rotatable between the standby position shown in FIG. 8A and the liquid delivering position where the cleaning liquid (fluid) F is delivered through the cleaning nozzle 93 to the upper surface of the nozzle substrate cluster 52A on the rotating stage 91.

Figure 9A:
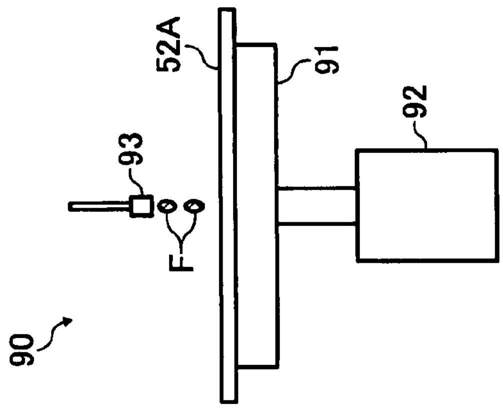
FIGS. 9A, 9B, and 9C illustrate diagrams representing a first cleaning method performed in the cleaning station.
Figure 9B:
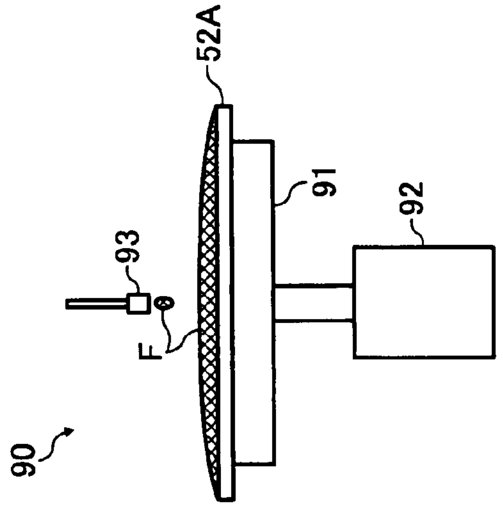
Figure 9C:
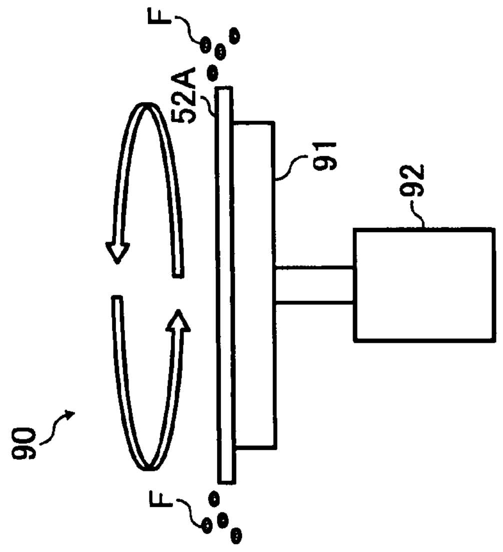

FIGS. 9A, 9B, and 9C illustrate a first method of cleaning performed by the cleaning station 90. At the cleaning steps shown in FIGS. 9A and 9B, an appropriate amount of cleaning liquid F is delivered through the cleaning nozzle 93 to the upper surface of the nozzle substrate cluster 52A on the rotating stage 91. At the cleaning step shown in FIG. 9C, the rotating stage 91 rotates to clean and spin-dry the nozzle substrate cluster 52A by moving the cleaning liquid F over the cluster 52A. Alternatively, cleaning may be performed by delivering the cleaning liquid F to the nozzle substrate cluster 52A that is rotating.

Figure 10A:
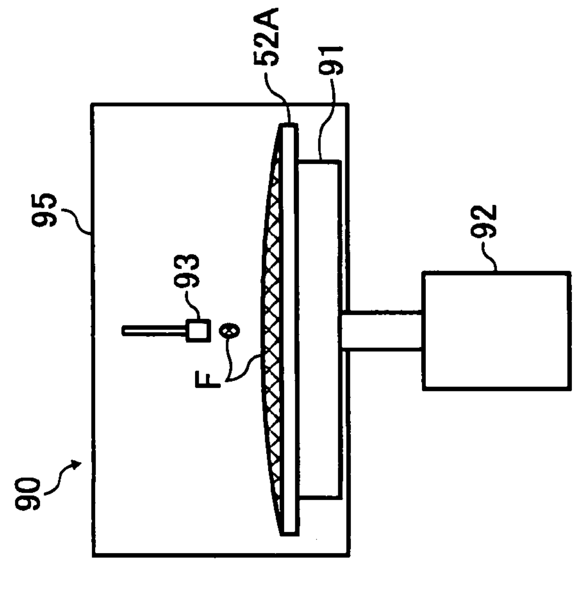
FIGS. 10A, 10B, and 10C illustrate diagrams representing a second cleaning method performed in the cleaning station.
Figure 10B:
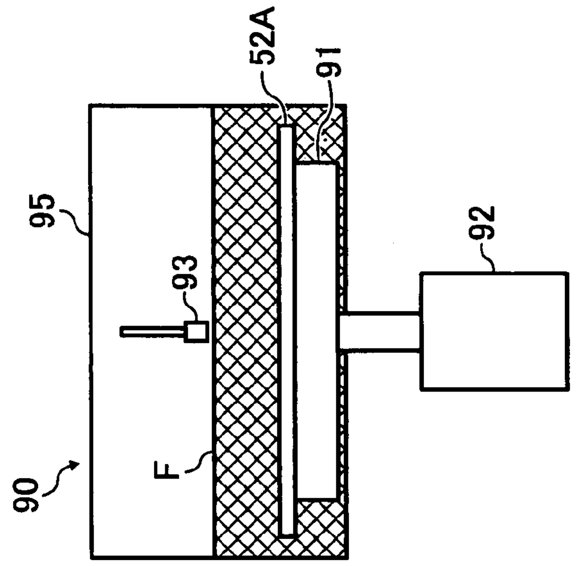
Figure 10C:
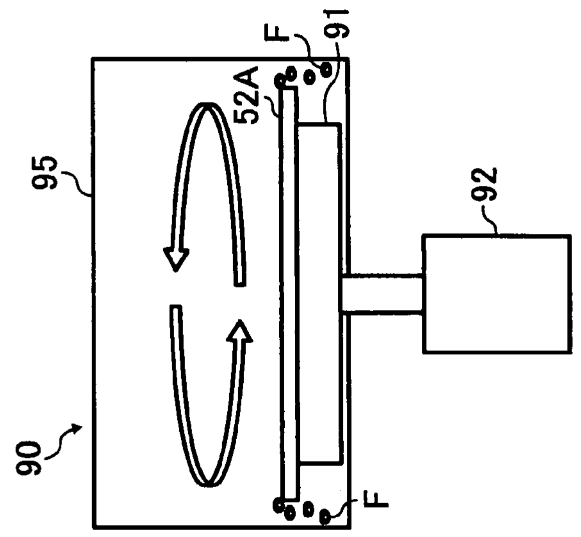

FIGS. 10A, 10B, and 10C illustrate a second method of cleaning performed by the cleaning station 90. In this cleaning method, the rotating stage 91 and the nozzle substrate cluster 52A are housed and enclosed in a case 95. At the cleaning liquid delivering step shown in FIG. 10A, the cleaning liquid F is delivered through the cleaning nozzle 93 to the upper surface of the nozzle substrate cluster 52A on the rotating stage 91. The cleaning liquid F is delivered until the rotating stage 91 and the nozzle substrate cluster 52A become submerged in the cleaning liquid F. The nozzle substrate cluster 52A is kept submerged in the cleaning liquid F for a length of time required to remove foreign particles. The rotating stage 91 may be rotated at an appropriate speed. Then, the cleaning liquid F is drained as shown in FIG. 10C by releasing a drain valve (not shown) of the case 95 and the rotating stage 91 is rotated to spin-dry the nozzle substrate cluster 52A.

The known cleaning operation performed in the dicing unit 82 consists of spraying cleaning water F to remove sawdust and foreign particles from the workpiece that is being cut by the dicing saw 84. More specifically, the cleaning water is pressurized to several Mpa and sprayed at a high speed through a nozzle to the nozzle substrate cluster 52A to remove sawdust and foreign particles by an impulsive force of the water. The cleaning effect depends on the flow rate of the cleaning water. A higher flow rate provides a higher cleaning effect. However, too high a flow rate will damage the nozzle substrate cluster 52A that is micromachined.

In contrast, the present disclosure uses a binary fluid containing microbubbles in the cleaning liquid F. More specifically, air is accelerated and liquid droplets are mixed into the accelerated air. The accelerated air and droplets are delivered to the surface of the nozzle substrate cluster 52A and sawdust and other foreign particles are removed by the jet of liquid and the shock waves produced by its collision against the cluster surface. When the droplets collide against the surface of the nozzle substrate cluster 52A, shock waves and expansion waves develop inside the droplets, around the point of contact with the nozzle substrate cluster 52A. It is considered that both the shock waves and the jet of liquid serve to markedly enhance the cleaning effect even with a relatively weak jet.

If the nozzle forming member cluster 50A that has fine holes bored at the points where nozzle holes are to be bored is bonded to the liquid chamber forming member cluster 50A and diced into individual nozzle substrates 52, sawdust would easily enter through nozzle holes (approximately 20 mm in diameter) and accumulate in the liquid chambers in the dicing operation. Even such sawdust in the depths of the liquid chambers can be removed completely by the cleaning performed in the cleaning station 90 following the cleaning performed during the dicing operation. Since a binary fluid containing microbubbles of 30 mm or less in diameter is used at both cleaning stages, the cleaning liquid penetrates into every corner of the nozzle holes and liquid chambers and removes and expels adhered sawdust and other foreign particles.

As described below, several cleaning methods were tested in the cleaning station 90 by changing conditions.

In a first comparative example, pure water was used as the cleaning liquid F in the cleaning station 90. In a second comparative example, a binary fluid containing air in pure water was used as the cleaning liquid F in the cleaning station 90.

In a first example, a microbubble-containing cleaning liquid made of pure water and air was used as the cleaning liquid F in the cleaning station 90. This microbubble-containing cleaning liquid contains microbubbles not larger than 30 mm in diameter, significantly smaller than normal bubbles (a few tenths of mm), produced by an OHR line mixer of Seika corporation. This line mixer produces microbubbles by forcing the binary fluid into microchannels formed by a static mixer fixedly stationed.

Figure 11:
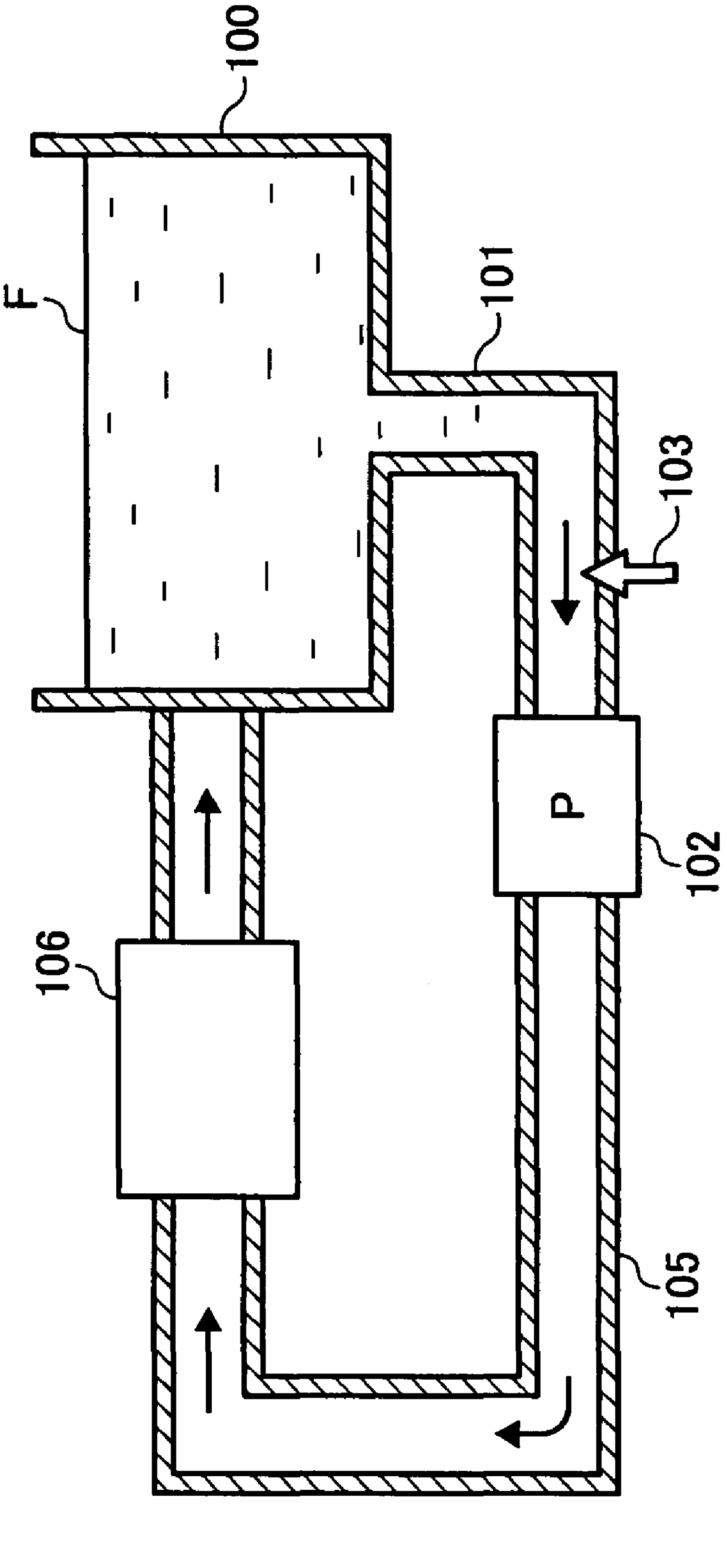
FIG. 11 illustrates a diagram schematically showing the structure of an air bubble generator incorporating a line mixer.

FIG. 11 illustrates the general structure of a bubble generator incorporating the line mixer. The bubble generator includes a tank 100, a pipe 101 communicating with the outlet of the tank 100, a pump 102, an air intake port 103 in the pipe 101, and a line mixer 106 interposed between the pump 102 and the tank 100. The liquid F mixed with the air from the air intake port 103 is delivered by the pump 102 toward the line mixer 106. The liquid F in the form of the binary fluid in the water tank 100 is circulated through the line mixer 106 and the bubbles are refined through microchannels formed by the static mixer. This circulation is repeated to further refine the bubbles until the bubbles in the cleaning liquid F are reduced to 30 mm or less in diameter. Known technologies related to microbubble generators are disclosed in the following patent documents: JP-A-2005-000882, JP-B-3785406, WO 01/036105, JP-B-3763521, and JP-A-2001-058142.

In a second example, similar to the comparative examples, the nozzle substrate cluster 52A was diced into chips and submerged in the microbubble-containing liquid prepared in the first example for a few minutes for cleaning (FIG. 10B).

In a third example, to enhance the cleaning effect, an ultrasonic wave was applied to the nozzle substrate cluster 52A submerged in the microbubble-containing liquid.

In fourth to sixth examples, after being diced, the nozzle substrate cluster 52A was cleaned in the cleaning station similarly to the first to third examples, but using a microbubble-containing cleaning liquid prepared using pure water and nitrogen gas.

A printing test was performed using inkjet recording heads incorporating the nozzle substrate 52 that was diced and cleaned as described above. Some of the nozzles cleaned using the cleaning liquid of either the first or second comparative example did not eject ink, while all the nozzles cleaned using the cleaning liquid containing microbubbles of any of the first to sixth examples did eject ink.

In the recording head manufacturing method according to the present disclosure, one face of the nozzle forming member cluster 50A is coated with a water-repellent film 60 and the other face is bonded to the liquid chamber forming member cluster 48A to form the nozzle substrate cluster 52A, and the adhesive tape 75 is attached to the nozzle substrate cluster 52A, on the water-repellent film 60. Then, the nozzle substrate cluster 52A is cut into chips and the adhesive tape is cut halfway therethrough. After individual nozzle substrates 52 that are held together by the adhesive tape are cleaned in the cleaning liquid F containing microbubbles, the adhesive tape is peeled off to produce chip-like nozzle substrates 52. Then, each nozzle substrate 52 is bonded to the actuator substrate 53. Since this method can produce many nozzle substrates in fewer steps and completely remove foreign particles, printing heads can be manufactured at a lower cost and in a higher yield without producing defective heads such as those ejecting no ink.

The cleaning method using the cleaning liquid containing microbubbles according to the present disclosure enhances the manufacturing efficiency, because sawdust produced when the nozzle substrate cluster 52A is diced into chips can be removed by jet-spraying the cleaning liquid containing microbubbles to the surface being cut. The cleaning method using the cleaning liquid containing microbubbles according to the present disclosure can completely remove foreign particles from fine grooves of the liquid chamber forming member, because sawdust adhered to the nozzle substrates are removed when the nozzle substrates held together by the adhesive tape are submerged in the cleaning liquid containing microbubbles. The rotating table carrying the nozzle substrates may be rotated as shown in FIG. 9C, after the cleaning liquid containing microbubbles is sprayed to the nozzle substrate cluster on the rotating table.

The cleaning method according to the present disclosure is also applicable for separately cleaning the nozzle forming member and the liquid chamber forming member before bonding them together. If the cleaning liquid containing microbubbles is made of pure water and inert gas, it is inexpensive and does not leave impurities (evaporated residues) after being dried. Since this cleaning liquid does not affect the materials of the liquid chamber forming member and the nozzle forming member, the materials can be selected from a wide range of choices. If the cleaning liquid containing microbubbles is made of pure water and air, it is inexpensive and does not leave impurities (evaporated residues) after being dried. The cleaning liquid containing microbubbles can also be made of pure water, organic alcoholic solvent, and inert gas or air, with bubbles not larger than 30 mm in diameter and the organic alcoholic solvent approximately 0.1-10% by weight with respect to the pure water. This cleaning liquid achieves an excellent cleaning effect and leaves no evaporated residue after being dried.

Inkjet recording apparatus and other image forming apparatus incorporating recording heads (droplet-ejecting heads) configured and produced according to the present disclosure will constantly record high-quality images.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. 2006-054123 filed on Feb. 28, 2006 and No. 2006-292965 filed on Oct. 27, 2006 in the Japan Patent Office, the entire contents of which are incorporated by reference herein.

What is claimed is:

1. A method for manufacturing a droplet-ejecting recording apparatus comprising a droplet ejecting head, the droplet ejecting head comprising (i) a plurality of droplet ejecting nozzles and a plurality of liquid chambers in communication with the nozzles, and (ii) a plurality of actuators configured to be driven to generate energy for ejecting droplets through the plurality of droplet ejecting nozzles, said method comprising:

(a) cleaning at least one member of the droplet-ejecting head through which a liquid containing the droplets passes using a cleaning liquid containing microbubbles, each of the microbubbles having a size smaller than a diameter of at least one of the plurality of droplet ejecting nozzles; and (b) bonding a surface of said at least one member of the droplet-ejecting head cleaned in (a) with another member of the droplet-ejecting head, to form a flow path in the droplet ejecting head for the liquid containing the droplets.

2. The method according to claim 1, wherein said at least one member of the droplet-ejecting head through which the liquid containing droplets passes is any one of: (a) a nozzle forming member including the plurality of droplet ejecting nozzles; and (b) a liquid chamber forming member including the plurality of liquid chambers.

3. The method according to claim 2, further comprising:

bonding a sheet-like liquid chamber forming member cluster including the plurality of liquid chambers to one face of a sheet-like nozzle forming member cluster including the plurality of droplet ejecting nozzles to form a nozzle substrate cluster;

attaching adhesive tape to one face of the nozzle substrate cluster;

cutting the nozzle substrate cluster into a plurality of individual nozzle substrates and cutting the adhesive tape halfway therethrough;

cleaning the plurality of nozzle substrates held together by the adhesive tape with the cleaning liquid containing microbubbles; and peeling off the adhesive tape from the plurality of nozzle substrates to produce chip-like nozzle substrates.

4. The method according to claim 3, further comprising jet-spraying the cleaning liquid containing microbubbles toward a surface being cut while the cutting operation is being performed.

5. The method according to claim 3, further comprising submerging the plurality of nozzle substrates cut apart and held together by the adhesive tape in the cleaning liquid containing microbubbles to remove adhered sawdust from the plurality of nozzle substrates.

6. The method according to claim 1, wherein the cleaning liquid comprises pure water and said microbubbles, the microbubbles comprising inert gas or air and being 30 mm or less in diameter.

7. The method according to claim 1, wherein the cleaning liquid comprises pure water, organic alcoholic solvent, and said microbubbles, the microbubbles comprising inert gas or air and being 30 mm or less in diameter, the organic alcoholic solvent being contained in the pure water.

8. The method of claim 1, further comprising:

cutting a nozzle forming member having the plurality of droplet ejecting nozzles formed therein into a plurality of individual nozzle substrates of a predetermined size, and after the nozzle forming member is cut, removing sawdust produced by the cutting by applying the cleaning liquid containing the microbubbles.

9. The method according to claim 1, wherein the microbubbles in the cleaning liquid have diameters of 30 mm or less.

10. The method according to claim 1, further comprising:
causing a nozzle substrate cluster including the plurality of droplet ejecting nozzles and the plurality of liquid chambers to be rotated; and
applying the cleaning liquid containing the microbubbles to a surface of the nozzle substrate cluster including the plurality of droplet ejecting nozzles and the plurality of liquid chambers, while the nozzle substrate cluster is being rotated, such that the cleaning liquid containing microbubbles is caused to enter and clean the plurality of droplet ejecting nozzles and the plurality of liquid chambers.

11. The method according to claim 1, further comprising:
applying the cleaning liquid containing the microbubbles to a surface of a nozzle substrate cluster including the plurality of droplet ejecting nozzles and the plurality of liquid chambers; and
spin-drying the nozzle substrate cluster to which the cleaning liquid containing the microbubbles has been applied.

12. The method according to claim 1, further comprising:
forcing a fluid including one of inert gas and air into microchannels formed by a static mixer fixedly stationed, until microbubbles of 30 mm or less in diameter are formed in the cleaning liquid.

13. The method according to claim 1, further comprising:
causing a nozzle substrate cluster including the plurality of droplet ejecting nozzles and the plurality of liquid chambers to be rotated; and
submerging the nozzle substrate cluster including the plurality of droplet ejecting nozzles and the plurality of liquid chambers in the cleaning liquid containing the microbubbles for a predetermined period of time, while the nozzle substrate cluster is being rotated.

14. The method according to claim 1, further comprising:
submerging a nozzle substrate cluster including the plurality of droplet ejecting nozzles and the plurality of liquid chambers in the cleaning liquid containing the microbubbles; and
applying an ultrasonic wave to any one of the plurality of droplet ejecting nozzles and the plurality of liquid chambers submerged in the cleaning liquid containing the microbubbles.

15. The method according to claim 1, wherein the cleaning liquid comprises pure water and said microbubbles, the microbubbles comprising nitrogen gas and being 30 mm or less in diameter.

16. The method according to claim 1, wherein each of the microbubbles has a diameter smaller than a diameter of at least one of the plurality of liquid chambers.

17. The method according to claim 1, wherein the cleaning by the cleaning liquid containing microbubbles removes particles, produced as a result of cutting operation performed during manufacture of the droplet-ejecting head, from at least one of the plurality of liquid chambers in (a), before the plurality of liquid chambers are bonded in (b) with said another member of the droplet-ejecting head in (b) to form the flow path in the droplet ejecting head.

18. A method for cleaning a droplet-ejecting recording apparatus comprising a plurality of droplet ejecting nozzles, said method comprising:
(a) rotating the plurality of droplet ejecting nozzles; and
(b) ejecting a cleaning liquid containing microbubbles to a droplet ejecting nozzle to clean the droplet ejecting nozzle, while the plurality of droplet ejecting nozzles are being rotated in (a), such that the cleaning liquid containing microbubbles is caused to enter and clean the droplet ejecting nozzle;
wherein each of the microbubbles included in the cleaning liquid has a size smaller than a diameter of the droplet ejecting nozzle.

19. The method according to claim 18, wherein the rotation of the plurality of droplet ejecting nozzles causes the cleaning liquid containing microbubbles to enter interior portions of the plurality of droplet ejecting nozzles to move and thereby clean said interior portions of the plurality of droplet ejecting nozzles.

20. A method for cleaning a nozzle substrate cluster including a plurality of droplet ejecting nozzles and a plurality of liquid chambers, said method comprising:
applying a cleaning liquid including microbubbles to the nozzle substrate cluster including the plurality of droplet ejecting nozzles and the plurality of liquid chambers to thereby clean the nozzle substrate cluster; and
bonding the nozzle substrate cluster to an actuator substrate including a plurality of actuators, after the nozzle substrate cluster including the plurality of liquid chambers has been cleaned by the cleaning liquid including the microbubbles.

* * * * *